Figure 9:
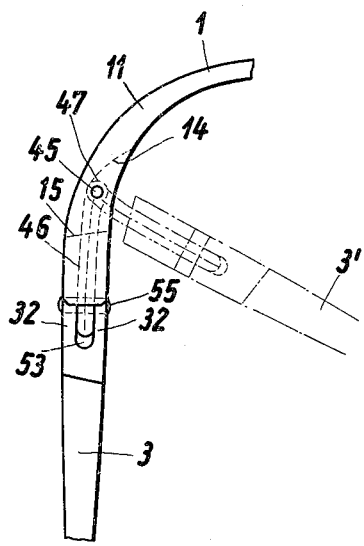

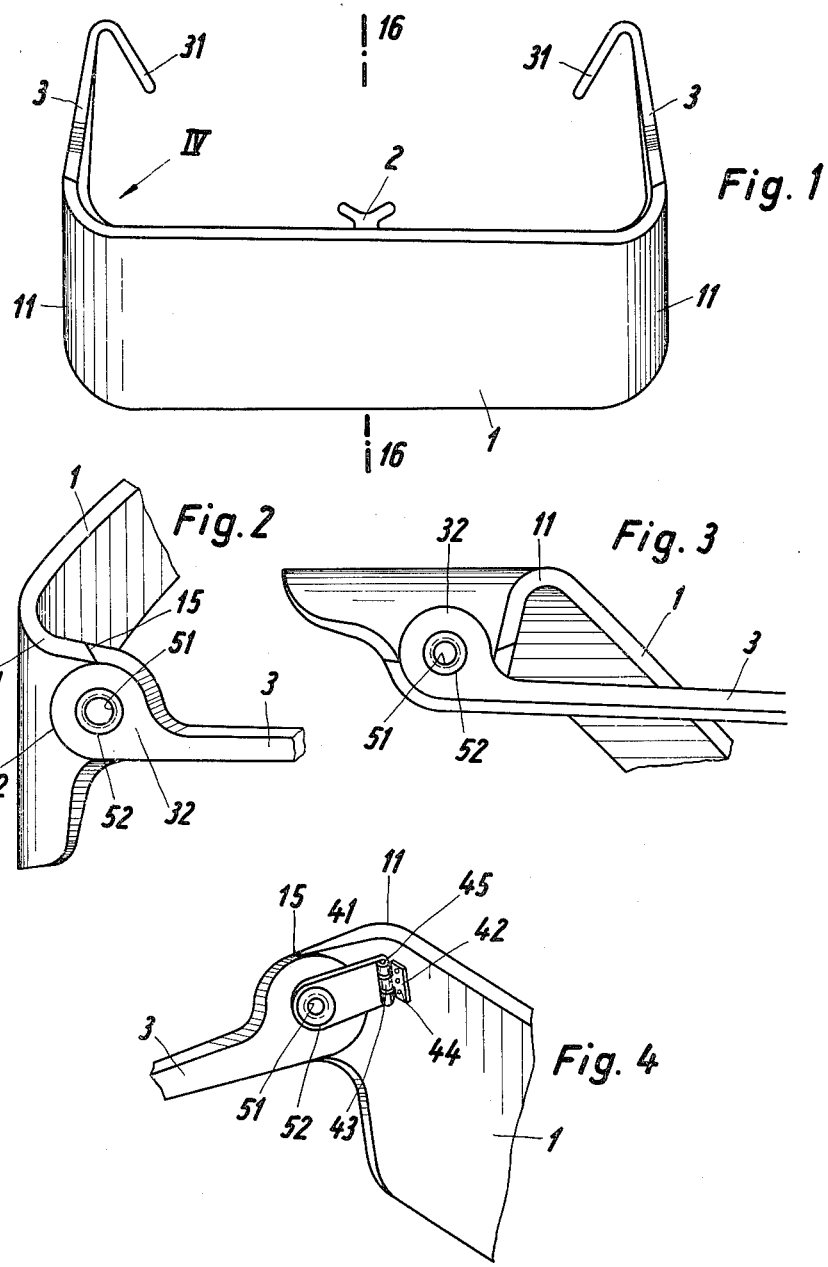

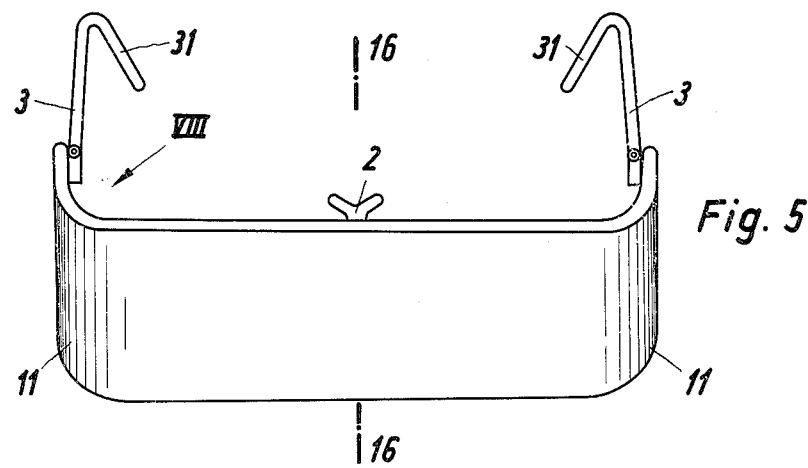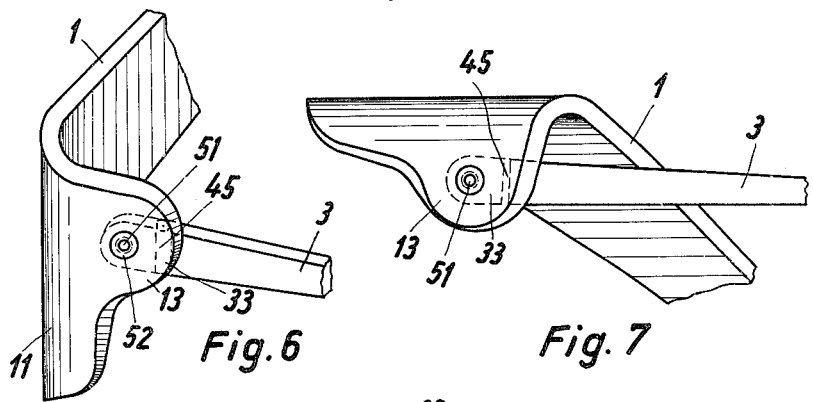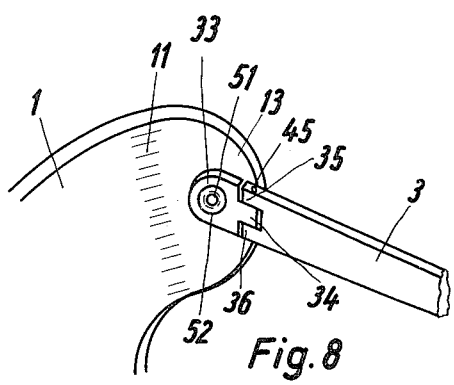

United States Patent Office 3,212,102
Patented Oct. 19, 1965

3,212,102
ANTI-GLARE DEVICE
Erich Müller, An der Golzheimer Heide 33,
Dusseldorf-Nord, Germany
Filed May 8, 1963, Ser. No. 278,863
Claims priority, application Germany, May 14, 1962,
M 52,843; Aug. 2, 1962, M 42,078; Oct. 27, 1962,
M 42,823; Apr. 18, 1963, M 44,493
4 Claims. (Cl. 2—12)

Anti-glare devices, which comprise a shade or visor, which prevents a direct incidence of rays of the sun into the eyes of the wearer, have been disclosed in various forms. The shade or visor has been secured to a separate holder, such as a forehead strap, or it was assumed that persons wearing spectacles have particularly sensitive eyes and require in many cases a protection from glare so that a number of devices have been designed for subsequently providing such optical spectacles with a shade or visor. These devices have been provided in various forms. For instance, clamps have been mounted on the sides or bows of the spectacles and these clamps have been provided with pivot arms, to which the shade or visor was connected so that it was rotatable owing to the pivotal connection. These clamps were provided, inter alia, in the form of clips having an approximately U-shaped cross-section so that the clamps could be fitted on and stripped of the sides or bows of the spectacles. Shearlike clamping devices provided with compression springs have also been used so that the shears gripped the sides or bows under the action of the compression spring whereas the clamp could be removed from the side or bow of the spectacles when the compression spring was compressed. Magnetic materials, particularly permanent magnets, have also been provided in the sides or bows or in the pivot arm for mounting the shade or visor so as to enable a solution to the existing problems. Finally, more than one shade or visor was mounted in the pivot joints to enable the positioning of shades or visors of different absorption, color or the like directly before the eye; these proposals relate mainly to the protection of the eye from being glared by approaching vehicles.

The present innovation is based on the recognition that proposals of this kind are not successful, for various reasons. Where forehead straps are used to provide a self-contained anti-glare device, it must be borne in mind that the glare of the sun is particularly inconvenient in the hot season so that the devices are mainly worn during this period of time. Because a strong radiation of the sun involves a corresponding increase of the temperature of the atmospheric air, the wearers of such anti-glare devices tend to perspire, particularly on the forehead. For this reason, forehead straps are not suitable for carrying the shade or visor, because they take up or absorb the secretion and become wet so that they are considered inconvenient and because they eliminate the cooling to which the forehead would be subjected in the absence of such forehead straps and are not satisfactory from a hygienic aspect when they have been worn frequently because they are in a condition to bind dust and become soiled quickly. On the other hand, the wearers of optical spectacles are not inclined to provide these spectacles with disturbing fixtures for the subsequent mounting of anti-glare devices, for instance, to tolerate for this purpose enlargements of the sides or bows in the form of circular discs to enable the accommodation of permanent magnets in the form of corresponding plates. These enlargements have an objectionable appearance like blinkers or blinders and give such an impression. Where clamping elements are employed, their manipulation is complicated if they comprise screws whereas arrangements comprising springs are bulky and so conspicuous that proposals of this kind have been rejected for reasons of appearance.

Because this approach does not lead to a solution, the present invention is based on the assumption that a subsequent connection of a shade or visor to optical spectacles can lead to a practical success only in exceptional cases and such anti-glare devices must constitute self-contained units. With optical spectacles it has become usual to form the so-called frame of the spectacles, including the rims of the glasses, the bridge holding the rims together and the lateral sides or bows, of plastic, more particularly of synthetic resins, in such a manner that the ends of the sides or bows are enlarged like a club and snap into a recess formed in the skull between the processus mastoidius and the bones defining the auditory canal. The retention thus afforded is sufficient for optical spectacles but cannot take up the larger turning moment which is generated with respect to said recess in the skull by the weight of the shade or visor acting with a leverage on the sides or bows, or cannot take up this turning moment with the safety which is enjoyed by a person wearing optical spectacles provided with a modern frame.

According to the recognitions which lead to the invention, the resulting technical problem is solved in that the shade or visor itself is provided with a nose rest having a bearing saddle and a web extension. In conjunction with the snapping of the ends of the sides or bows, the wearer of such an anti-glare device enjoys the same safety as one who wears optical spectacles. The nose rest does not hinder in any way because it may be glass-clear as contrasted with the shade or visor for protecting the eyes, which absorbs the glaring light, so that the nose rest does not at all affect the view. Such synthetic resins include, for instance, polymethacrylic esters.

There are two basic possibilities for designing such anti-glare devices. In the first place, the shade or visor may be movable to different positions, or this adjustability to the respective direction of the glaring light rays may be omitted. In the first case, the sides or bows of the device are arranged to be rotatable and pivotally movable relative to the shade or visor, specifically, they are rotatable in planes which are parallel to the central plane of symmetry of the shade or visor, whereas the sides or bows are pivotally movable about straight lines which belong to the same plane and which extend vertically or approximately vertically when the device is being worn, and are disposed at the lateral ends of the shade or visor. This may be achieved in various ways. The first of these resides in that the sides or bows are designed like a turntable at their end adjacent to the shade or visor and the turntables are closingly and rotatably received in correspondingly shaped openings at the lateral ends of the shade or visor. The ends of the shade or visor are preferably rounded to enable a pleasing appearance to be given to the transition to the sides or bows. The turntables formed by the sides or bows and those wall portions of the shade or visor which define the openings therein suitably contact each other with surfaces extending at an acute angle to the above-mentioned central plane of symmetry of the shade or visor when the device is in the position in which the longitudinal direction of the sides or bows is parallel or approximately parallel to the outer boundary plane of the shade or visor. This results in large contact surfaces so that a deformation will not be caused by the relatively large forces which are effective when rotary movements of the sides or bows relative to the shade or visor are carried out too vigorously or occur unintentionally because the device falls on the ground. The pivoted arrangement may usually be provided by hinges of known kind, which are suitably provided on the inside boundary wall of the rounded lateral portions of the shade or visor. It is not necessary, however, for the hinges and the holding straps connected to the hinges to be attached to or mounted on the inside wall of the shade or visor or of the sides or bows. For instance, that portion of the sides or bows which is similar to a turntable may be formed with a slot so that the sides or bows have two extensions which are similar to a turntable and which receive between them one of the straps of the hinges, which is concealed in the shade or visor, so that in this case the hinge pin is entirely accommodated or disposed in the material which forms the shade or visor whereas the turntables of the sides or bows are planoparallel with respect to each other and define the above-mentioned slot space, which may be subsequently formed by milling in the turntablelike enlarged portion of the sides or bows. The hinge pins may suitably consist in this case of hollow rivets, which may readily be designed to have a diameter which provides for the above-mentioned large contact surfaces.

For a rotatable arrangement of the sides or bows relative to the shade or visor, cardanlike joints may be provided, which consist, for instance, of turntables accommodated in corresponding openings in the sides or bows and carrying extensions which are pivotally movable relative to the shade or visor and consisting, for instance, of a nose extension disposed between two lugs formed by the shade or visor. This results also in large, extended joint surfaces, which can be formed by synthetic resins or plastics when metallic pivot members, such as pins or bolts etc., should be avoided because they tend to corrode. Anti-glare devices according to the invention serve mainly for protection against the sun and for this reason are used in the hot season. This involves high temperatures and a perspiration by the wearer; the constant action of the perspiration on metallic parts may result in strong corrosion and undesired changes of the surface quality of such parts. Besides, many persons are allergic to the formation of metal salts so that a rash or eczema develops. This leads to the problem to design such anti-glare devices so as to avoid a contact of metallic parts with the skin of the wearer as far as possible. This object is accomplished by the last-mentioned embodiment.

Another possibility, which will now be discussed, resides in omitting a rotatable and pivotally movable arrangement of the shade or visor relative to the sides or bows. This results in anti-glare devices which are particularly simple, unconspicuous, light, simple in shape and of modern design.

This object is accomplished by an anti-glare device which comprises a shade or visor for preventing a direct incidence of glaring rays into the eye of the wearer of the device and in which the shade or visor and the sides or bows carrying it consist of a single, physically coherent unit. This eliminates all conspicuous means serving for a subsequent attachment to optical spectacles. The structure of the device is utterly simple. There are no joints which tend to wear and to corrode under the above-mentioned action of corrosion if these joints consist of metals, as is usual. This results in a reduction in weight. The device can be made as a unit by a simple compression- or injection-molding operation because special materials are not required to form the shade or visor. It is sufficient if the material which is used has the absorption which effects the required dimming of the incident sun rays. The sides or bows may consist of the same material. On the other hand, it is not necessary to make the shade or visor and the sides or bows from the same material. For instance, at least the sides or bows may be made from a material which is adaptable to the shape of the head, for instance, from a plastically yielding synthetic resin. Because synthetic resins can be welded without difficulty, the welded joint is not conspicuous and particularly it is sufficient if the parts consist of a physically coherent unit whereas they need not consist of the same material. In this case, however, the sides or bows suitably incorporate reinforcing inserts made from a material which is deformable only by flexure, for instance, of soft iron wire, so that the sides or bows can be given any required strength by the selection of a suitable thickness of the wire, a suitable number of wires, and a suitable material; the same applies to the contact pressure of the sides or bows on the head for reliably holding the device on the head. For the same reason, the wall thickness of the sides or bows, measured at right angles to their longitudinal direction and at right angles to their faces, will be made smaller than the wall thickness of the shade or visor, also measured at right angles to its faces. This results in a certain yieldability of the sides or bows whereby the adaptability of the device to the shape of the head is improved.

The drawing illustrates several embodiments of the invention.

Figure 10:
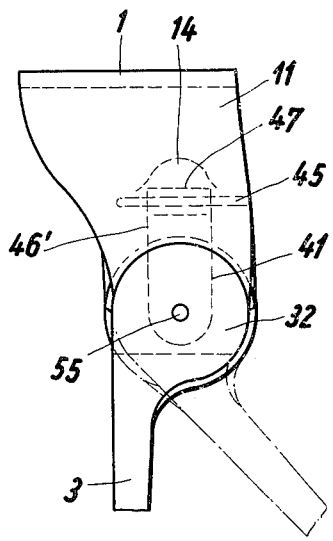
Figure 11:
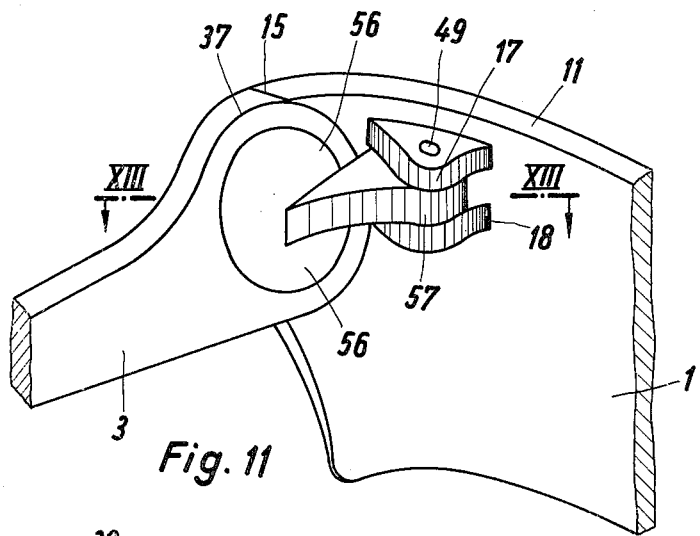
Figure 12:
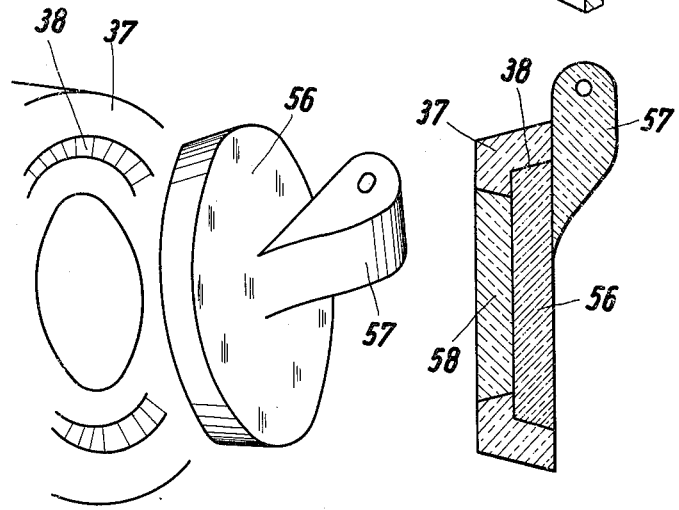
Figure 13:
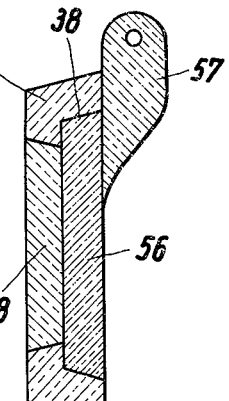
Figure 14:
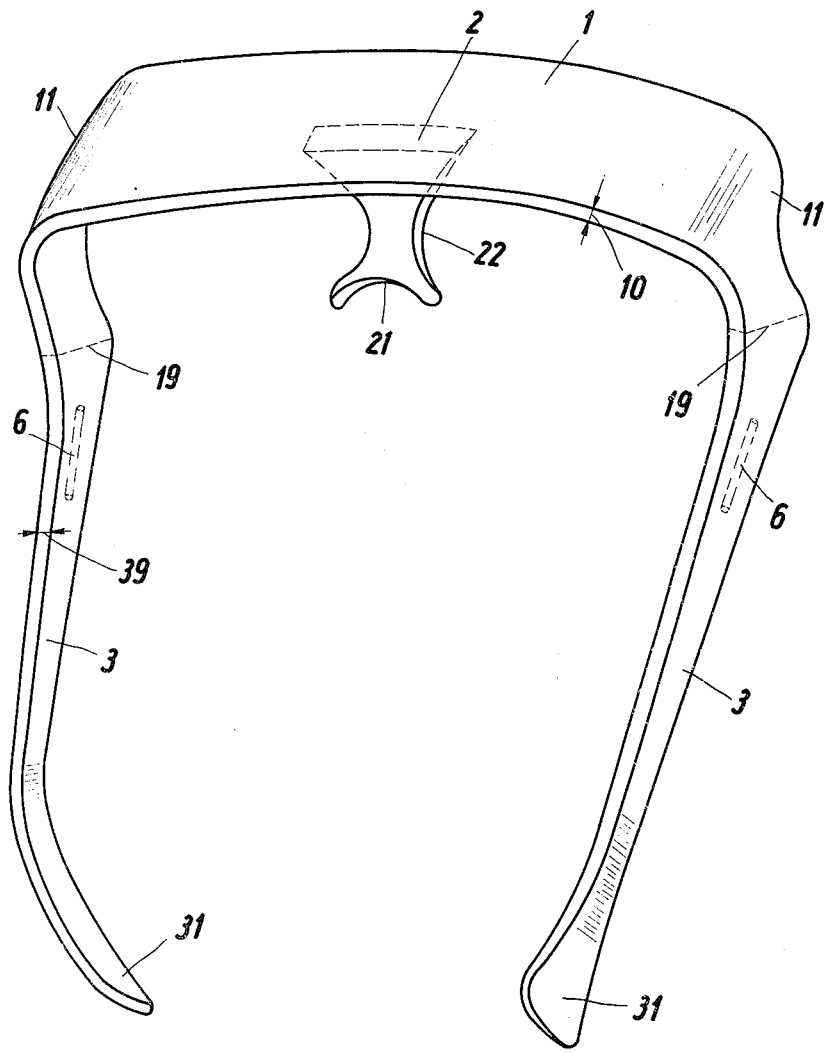

Specifically, FIG. 1 is a top plan view showing an anti-glare device embodying the invention, viewed in a direction approximately at right angles to the shade or visor. FIG. 2 is a side elevation showing the anti-glare device of FIG. 1 with the shade or visor swung down to a position before the eyes. FIG. 3 is a similar view showing the parts in the position in which the shade or visor is swung up so that the eyes of the wearer of the anti-glare device are exposed. FIG. 4 is a view of the anti-glare device taken in the direction of the arrow IV in FIG. 1. FIG. 5 is a view similar to FIG. 1 and showing an anti-glare device having sides or bows which are rotatable and pivoted as is shown in FIGS. 6 to 8. FIG. 6 is an elevation showing on a larger scale the design of the rotary and pivot pins with the shade or visor swung down. FIG. 7 is a similar view showing the shade or visor swung up. FIG. 8 is a view of the anti-glare device taken in the direction of the arrow VIII in FIG. 5. FIG. 9 is a top plan view showing the shade or visor and the sides or bows of an embodiment, in which the rotary and pivoted joints are entirely disposed within the material which forms the shade or visor and the sides or bows. FIG. 10 shows this embodiment in a side elevation. FIG. 11 shows on a larger scale another embodiment, in which the parts forming the rotary and pivoted points have large surfaces so that they can be made entirely from plastics or synthetic resins. FIG. 12 shows the components taken apart whereas FIG. 13 is a horizontal sectional view taken on line XIII—XIII of FIG. 11. Finally, FIG. 14 is an embodiment of an anti-glare device in which the parts are not rotatable and pivotally movable relative to each other.

The main parts of a device embodying the invention are the shade or visor 1, the nose rest 2 and the sides or bows 3, which may be described as head-engaging members because they engage the head, and as carrying members because they carry the shade or visor 1. The end portions 31 of the sides or bows are enlarged in the shape of clubs, in usual manner, and snap into the recess in the skull repeatedly mentioned above to reliably hold the device in the desired position. The shade or visor 1 is reversely bent at its lateral ends 11 to enable a transition to the sides or bows 3. In the embodiment shown in FIGS. 1 to 4, these bows have enlarged portions 32, which are similar to turntables and are received by corresponding cut-out portions 12 of the shade or visor. To provide for a rotary connection, hinge straps 41 are provided, which enable at the same time a pivotal movement of the sides or bows 3. For this purpose, the shade or visor 1 or 11 has connected to it the lugs 42, which form an inturned hinge strap at 43 and are held in position by small rivets or screws 44. A hinge pin 45 extends through the whole so that the strap 41 can be pivotally moved relative to the part 42 and the shade or visor 1, 11. The strap 41 serves for fixing the hollow rivet 51, which has a beaded rim 52 engaging the turntable portion 32 of the sides or bows 3 so that the latter are rotatable relative to the strap 41 and the shade or visor 1, 11.

Another embodiment of the invention is shown in FIGS. 5 to 8. In these figures, parts having the same reference characters as in FIGS. 1 to 4 have the same significance. Different are the means for rotatably and pivotally connecting the sides or bows to the shade or visor 1. The cut-out portion 12 in the curved extensions 11 of the shade or visor 1 is now replaced by projections 13 of the shade or visor 1, 11, which projections serve for carrying the hollow rivets 51 having the beads 52 so that the sides or bows 3 are rotatable relative to the shade or visor 1. The pivot means are disposed in the sides or bows 3 themselves and consist of pivot pins 45, which connect the sides or bows to the separately provided end portions 33 thereof. For this purpose, an extension 34 of the end piece 33 engages a forked extension 34, 35 of the sides or bows 3.

A further embodiment of the invention is illustrated in FIGS. 9 and 10.

The sides or bows 3 are again provided with turntablelike projections 32, which are now bifurcated to define a space 53, which accommodates the strap 46 of the hinge comprising the hinge pin 45. A pin 55 extends through the parts 32 and 46 so that the sides or bows 3 are rotatable about this pin 55 and the shade or visor can be adjusted to any desired angular position relative to the sides or bows 3. The hinge pin 45 extends through the inturned end portion 47 of the strap 46 to form the joint which enables the pivotal movement of the sides or bows 3 into the position 3' shown by way of example in dash and dot lines. As is apparent from FIG. 10, the hinge pin 45 is held directly in the material of parts 1, 11 and protrudes on both sides beyond the width of the strap 46 and is accommodated in a suitable bore in parts 1, 11. To enable a free movement of the strap 46, the material forming the parts 1, 11 is cut out at 14. The embodiment shown in FIGS. 9 and 10 has the advantage that the skin of the wearer of the anti-glare device is not contacted by metallic parts. The parts 45, 46 and 55 are entirely disposed in and accommodated by the material of the parts 1, 11 and 3, 32. The abutment 15 acting between parts 11 and 32 is designed so that an imaginary extension of the contact surface intersects at an acute angle the plane of symmetry of the anti-glare device, which plane of symmetry is indicated at 16—16 in FIGS. 1 and 5. This results in extended contact surfaces, which prevent in the case of a too vigorous manipulation or a dropping of the device a generation of forces which would result in deformation when the contact surfaces engage.

Another illustrative embodiment of the invention is shown in FIGS. 11 to 13.

It is apparent from these figures that the end portions 37 of the bows or sides 3 have an eyelike profile in cross-section, as is shown particularly in FIG. 13. This results in the formation of a bearing surface 38 for the disc 56, which acts as a bearing body for the rotary movement of the sides or bows 3 because its extension 57 is pivotally disposed between projecting lugs 16, 17 formed by the parts 1, 11. For this purpose, a pivot pin 49 is provided, which extends transversely through the parts 16, 57, 17. Another conical disc 58, which is also received by the eyes 37 of the sides or bows 3, holds the whole structure together by being firmly connected to the disc 56, for instance, by pinning or, preferably, by adhering. This results in large, extended bearing surfaces, which will not wear even when all relatively moving members consist of synthetic resins or plastics. Whereas the same applies to the pivot pin 49, it may consist of metal because it cannot contact the skin of the wearer of the anti-glare device. It is apparent that whereas in the embodiment shown in FIGS. 9 and 10 any metal parts which may be required are accommodated entirely within the parts of synthetic resin or plastic, these metal parts are substantially entirely eliminated in the embodiment shown in FIGS. 11 to 13.

This applies also to the last-mentioned embodiment shown in FIG. 14 and consisting entirely of plastic or synthetic resin, without any relatively rotatable and pivotally movable parts. The following remarks are made with respect to this embodiment of the invention.

In the embodiment shown in FIG. 14, the shade or visor 1, 11 and the sides or bows 3 consist of a physically coherent unit. If the sides or bows are welded to the shade or visor 1, 11, as is indicated at 19, or are physically inseparably connected to it in other ways, this will not change the physical coherence of parts 1, 11, 3. In this case, it is possible, for instance, to make only the sides or bows from a material which is adaptable to the shape of the head, for instance, from plastically yielding synthetic resins. This does not preclude the making of the shade or visor 1, 11 from such materials, particularly it is not subjected to stresses which could result in a deformation of the shade or visor 1, 11 to an undesirably large extent if it consists of a plastically yielding material. The end portions 31 of the sides or bows are designed as is usual with optical spectacles to ensure and maintain a reliable support of the anti-glare device. A nose rest having a saddle-shaped portion 21 and provided with a web 22 is secured to or integral with the shade or visor 1 to take up the turning moment which is generated in the manner described hereinbefore and which is somewhat greater than with spectacles. Numeral 6 refers to wire inserts, particularly of soft iron, which may be provided as reinforcements in the sides and bows 3 when such reinforcements appear necessary. Glass fibers or other fiber-like reinforcing materials 6 may alternatively be incorporated there. The wall thickness 39 of the sides or bows is suitably somewhat smaller than the wall thickness 10 of the shade or visor 1 so that the adaptability of the sides or bows 3 to the shape of the head is improved. The material used for making the shade or visor 1 has the required absorption for incident light rays. Because this involves a certain darkness of the color of the material, even though the same may be transparent, the sides or bows 3 are attached to the shade or visor 1 in the manner mentioned above if this dark color is undesired in the sides or bows 3. This does not eliminate the physical coherence. The same applies to the nose rest 2, which consists suitably of perfectly transparent polymethacrylic esters, which owing to their glass-clear nature do not render the rest conspicuous and do not affect the vision of the wearer of the anti-glare device.

It is inherent in the nature of the invention that the same is not exhausted by the illustrative embodiments shown and the basic teachings of the invention can be modified in various ways within the scope of the invention.

What I claim is:

1. An anti-glare eyeshade comprising, in combination, a visor elongated in a given direction and having a surface in a given plane and extending in said given direction, said visor further having opposite ends extending transversely of said surface and formed with respective free edges spaced from said surface, said free edges being arcuately recessed in the direction of said surface; a pair of bows having an active position and extending in said active position from said opposite ends of said visor substantially at right angles to said surface and being adapted to engage the head of a wearer, said bows respectively having an end portion adjacent said visor and the respective end portion being formed with respective dish-shaped formation received within said recesses of said free edges; and means connecting said bows to the respective ends of said visor, said means including first pivot means at each of said ends and extending transversely of the elongation of said visor, a first hinge member on each of said bows and a second hinge member at each of said ends of said visor, said first pivot means pivotally connecting said hinge members for permitting turning of said bows about respective first axes from said active position into a folded position in which they extend parallel to said visor, and second pivot means at each of said ends and extending through respective axes of said first hinge member and said formation transversely of said first axes for permitting fitting adjustment of said visor about respective second axes parallel to the direction of elongation of said visor between an operative position in which said surface extends substantially vertically in front of the eyes of a wearer for reducing glare, and an inoperative position in which said surface extends substantially horizontally and at an angle to the forehead of a wearer.

2. An anti-glare eyeshade as defined in claim 1 wherein said bows are elongated and said formations are formed with respective slots extending transversely of said elongation, and wherein the respective ends of said visor each have an outer and an inner surface, the respective inner surfaces being directed toward one another and being formed with respective depressions transversely of said arcuate recesses and communicating therewith, said first hinge members being partially received in the respective ones of said depressions and extending into said arcuate recesses and said slots of said formations received therein; and said second hinge members including said first pivot means being received within said depressions and turnably securing said first hinge members therein for folding of said bows in opposite directions into abutting relationship with said visor with their direction of elongation parallel to that of said visor.

3. An anti-glare eyeshade as defined in claim 1, further comprising a nose rest integral with said visor and adapted to engage the nose of a wearer for stabilizing said eyeshade.

4. An anti-glare eyeshade as defined in claim 1, wherein at least said visor is of a synthetic resin material.

References Cited by the Examiner
UNITED STATES PATENTS

| | | | |
|---|---|---|---|
| 1,083,702 | 1/14 | Persohn. | |
| 2,616,082 | 11/52 | Creighton | 2—14.21 X |
| 2,632,164 | 3/53 | Hanford | 2—12 |
| 2,668,291 | 2/54 | Schauweker | 2—14.17 |

JORDAN FRANKLIN, *Primary Examiner.*